US006967235B2

(12) United States Patent
Seidel et al.

(10) Patent No.: US 6,967,235 B2
(45) Date of Patent: Nov. 22, 2005

(54) METHOD FOR THE PRODUCTION OF POLYBUTYLENE TEREPHTHALATE

(75) Inventors: Eckhard Seidel, Frankfurt am Main (DE); Fritz Wilhelm, Karben (DE)

(73) Assignee: Zimmer Aktiengesellschaft, Frankfurt am Main (DE)

( * ) Notice: Subject to any disclaimer, the term of this patent is extended or adjusted under 35 U.S.C. 154(b) by 73 days.

(21) Appl. No.: 10/479,339

(22) PCT Filed: Apr. 16, 2002

(86) PCT No.: PCT/EP02/04182

§ 371 (c)(1),
(2), (4) Date: May 21, 2004

(87) PCT Pub. No.: WO02/098947

PCT Pub. Date: Dec. 12, 2002

(65) Prior Publication Data

US 2004/0236067 A1 Nov. 25, 2004

(30) Foreign Application Priority Data

Jun. 2, 2001 (DE) .......................... 101 27 146

(51) Int. Cl.[7] ............................ C08G 63/78; C08K 3/10
(52) U.S. Cl. .................... 528/279; 528/274; 528/308.6; 524/789
(58) Field of Search ............................. 528/274, 279, 528/308.6; 524/783

(56) References Cited

U.S. PATENT DOCUMENTS

| 4,056,514 | A | * | 11/1977 | Strehler et al. | ............. 528/274 |
| 4,198,161 | A | | 4/1980 | Larson | ........................ 356/339 |
| 4,346,213 | A | * | 8/1982 | Hall, Jr. et al. | ............. 528/272 |
| 4,439,597 | A | * | 3/1984 | Hall, Jr. et al. | ............. 528/272 |
| 4,499,261 | A | * | 2/1985 | Heinze et al. | ............. 528/279 |
| 6,060,579 | A | * | 5/2000 | Ohme et al. | ................ 528/279 |
| 6,166,170 | A | | 12/2000 | Putzig | |
| 6,303,738 | B1 | * | 10/2001 | Putzig et al. | ................ 528/271 |
| 6,657,040 | B1 | * | 12/2003 | Heitz et al. | ................. 528/279 |
| 6,762,235 | B2 | * | 7/2004 | Takenaka et al. | ........... 524/494 |
| 6,812,321 | B1 | * | 11/2004 | Heitz et al. | .............. 528/309.1 |

FOREIGN PATENT DOCUMENTS

| WO | WO 99 28033 A | 6/1999 | ............ B01J/31/12 |
| WO | WO 99/45056 | 9/1999 | ........... C08G/63/85 |

* cited by examiner

*Primary Examiner*—Samuel A. Acquah
(74) *Attorney, Agent, or Firm*—Norris McLaughlin & Marcus PA

(57) ABSTRACT

In a process of producing PBT, a mixture of BDO and TPA is esterified in the presence of a catalyst solution, and the esterification product is polycondensated. To avoid the formation of deposits in the PBT, the catalyst solution contains 0.05 to 10 wt-% alkyl titanate, 85 to 99 wt-% BDO, 50 to 50,000 ppm bifunctional carboxylic acid equivalents and/or monofunctional hydroxycarboxylic acid equivalents and not more than 0.5 wt-% water.

11 Claims, 1 Drawing Sheet

METHOD FOR THE PRODUCTION OF POLYBUTYLENE TEREPHTHALATE

This is a 371 of PCT/EP02/04182 filed 16 Apr. 2002 (international filing date).

BACKGROUND OF THE INVENTION

This invention relates to a process of producing polybutylene terephthalate (PBT) from butanediol (BDO) and terephthalic acid (TPA) or from butanediol (BDO) and dimethyl terephthalate (DMT), in which a mixture of BDO and TPA or BDO and DMT is subjected to an esterification or transesterification and subsequently to a polycondensation, in the presence of a catalyst solution containing alkyl titanate at temperatures in the range from 130 to 260° C.

It is known that PBT is produced from TPA or DMT by reaction with BDO by using catalysts. From among the multitude of catalysts used, in particular alkyl titanates, preferably tetrabutyl orthotitanate and tetraisopropyl orthotitanate, have gained acceptance due to their efficiency and large-scale availability (Ullmann's Encyclopedia of Industrial Chemistry, 5th edition, vol. A 21, page 237). The alkyl titanates have properties which have a disadvantageous effect in the production of PBT, because they tend towards hydrolysis and in particular in the process of producing PBT on the basis of TPA form insoluble particles during esterification, which particles not only reduce the service life of the filters for the PBT melt, but also impair the quality of the PBT produced. As a result of their volatility, thermal decomposability and easy reducibility, alkyl titanates can also form titanium-containing dark deposits at the reactor walls and in the process column, which impair the quality of the PBT produced.

SUMMARY OF THE INVENTION

To avoid the negative effects of alkyl titanate during the production of PBT, various stabilization methods for the catalysts are known (WO-A-99/45056), in that additional substances foreign to the process are added to said catalysts, which substances in turn involve certain disadvantages.

It is the object underlying the invention to provide a catalyst solution of improved reactivity, which is resistant to hydrolysis and stable in storage and does not form any deposits during the production of PBT, in particular also during esterification. Moreover, negative influences on the PBT produced as well as disturbing residues on the product melt filters should be avoided.

DETAILED DESCRIPTION

This object is solved in that the catalyst solution contains 0.05 to 10 wt-% alkyl titanate, 85 to 99 wt-% BDO, 50 to 50,000 ppm, preferably 50 to 30,000 ppm dicarboxylic acid and/or hydroxycarboxylic acid and/or monohydroxyalkyl dicarboxylic acid and not more than 0.5 wt-% water. Such catalyst solution forms a clear, particle-free mixture of the above-mentioned components.

The catalyst solution can be used both for the continuous and for the discontinuous production of PBT by esterification of TPA with BDO and also for the transesterification of DMT with BDO. Under inert conditions, the catalyst solution can permanently be stored at temperatures above 25° C. in the liquid condition and at temperatures below 20° C. also in the solid condition. A decisive advantage of the catalyst solution is the fact that its excellent stability is based on the use of process-conformal components which are completely incorporated in the PBT produced and are not left as disadvantageous byproduct. What turned out to be particularly advantageous is the use of TPA or isophthalic acid in BDO as solubilizer for alkyl titanate, as the polymer properties of PBT are not or only insignificantly influenced thereby.

The production of the catalyst solution is effected in that first of all a preliminary solution is produced by mixing BDO with alkyl titanate at temperatures of 50 to 230° C., and dicarboxylic acid and/or hydroxycarboxylic acid and/or hydroxyalkyl dicarboxylic acid monoester are added to this preliminary solution.

Another possibility for producing the catalyst solution consists in that first of all a preliminary solution is produced by mixing BDO with dicarboxylic acid and/or hydroxycarboxylic acid and/or monohydroxyalkyl dicarboxylic acid at temperatures of 50 to 230° C. and alkyl titanate is added to this preliminary solution. The catalyst solutions should only have a limited water content of not more than 0.5 wt-%, as with a larger water content turbidities or precipitations may occur during the further processing. The catalyst solutions have a turbidity value NTU (Normal Turbidity Unit) of $\leq 1$. The NTU value, which is a measure for the turbidity of solutions, is determined for a 10 wt-% solution of polyester in phenol/dichlorobenzene (3:2 parts by weight) in the nephelometer of the firm Hach (type XR, according to U.S. Pat. No. 4,198,161) with a cuvette having a diameter of 22.2 mm, analogously to the DIN standard 38 404, part 2, commonly used for water. There is measured the intensity of the scattered light as compared to a standard formalin solution minus the value of the solvent (about 0.3 NTU). Solutions with NTU values $\leq 2$ are completely clear; with NTU values >2 turbidities occur more and more.

For producing the catalyst solutions, both aromatic and aliphatic dicarboxylic acids can be used singly or several of them as a mixture. Aromatic dicarboxylic acids are for instance TPA and isophthalic acid. The aliphatic dicarboxylic acids include for instance oxalic acid, malonic acid, succinic acid and adipic acid. The dicarboxylic acids can wholly or partly be replaced by aromatic and aliphatic hydroxycarboxylic acids and/or monohydroxyalkyl dicarboxylic acid, in particular monohydroxybutyl terephthalic acid. Aromatic hydroxycarboxylic acids are, for instance, 3-hydroxybenzoic acid and 4-hydroxybenzoic acid. Aliphatic hydroxycarboxylic acids include, for instance, hydroxybutyric acid, hydroxypropanoic acid and glycolic acid. Mixtures of these hydroxycarboxylic acids may also be used. Monohydroxybutyl terephthalic acid is formed in the process from TPA and BDO. Tetrabutyl orthotitanate and tetraisopropyl titanate turned out to be particularly useful as alkyl titanate.

For producing PBT it is possible to meter the catalyst solution in the process at one point or also simultaneously at several points. The catalyst solution can, for instance, already be added to the paste formulation or to a subsequent process stage or to a melt transfer line. It is also possible to feed the catalyst solution into the reflux of BDO from the process column to the first process stage and possibly into a subsequent process stage.

A particularly advantageous embodiment of the process in accordance with the invention is the direct production of the catalyst solution during the process of producing PBT, wherein alkyl titanate is transferred into the catalyst solution in a mixing line with the terephthalic acid reflux of BDO from the process column to the first esterification stage and/or further esterification stages. In this case, the reflux of BDO includes the preliminary solution in accordance with the invention.

Figure 1:
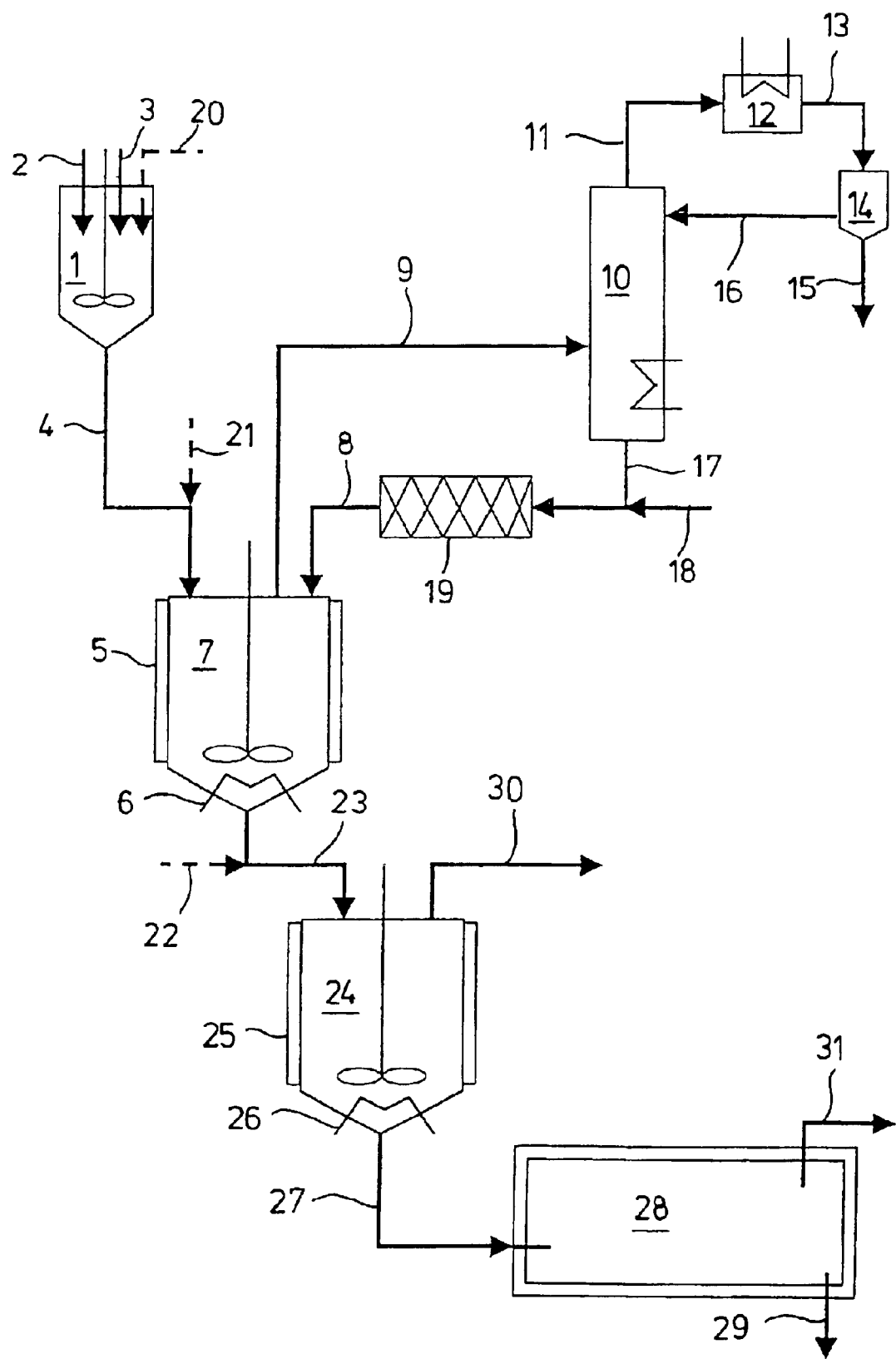
FIG. 1 (hereinafter "the drawing") illustrates the process of the present invention.

In the drawing, the process of producing PBT from BDO and TPA is represented by way of example as a flow diagram of the apparatus and will subsequently be explained in detail:

To a stirred tank (1), TPA is supplied via line (2) and BDO is supplied via line (3) and mixed to form a paste which via line (4) is fed into a stirred reactor (7) surrounded by a heating jacket (5) and equipped with an additional heating element (6), for esterification. During esterification, a liquid BDO/oligomer mixture and vapor are formed, the latter substantially consisting of water, BDO, and tetrahydrofuran (THF). In the case of the transesterification of DMT in the stirred reactor (7), the vapor formed substantially contains methanol, BDO, THF and water. The esterification in the stirred reactor (7) is effected in the presence of the catalyst solution supplied via line (8). The vapor formed in the stirred reactor (7) leaves the stirred reactor (7) via line (9) and is supplied to the distillation column (10), in which water and THF are separated overhead. The overhead product of the distillation column (10) is supplied via line (11) to the cooler (12) from which the condensate is discharged via line (13) to the reflux distributor (14). From the reflux distributor (14), water and THF are withdrawn via line (15), and the reflux is recirculated to the top of the distillation column (10) via line (16). From the bottom of the distillation column, a mixture consisting of higher-boiling components, usually containing 90 to 99 wt-% BDO and 50 to 3000 ppm dicarboxylic acid and monohydroxyalkyl dicarboxylic acid, which were obtained by monomer evaporation and possibly by subsequent hydrolysis of ester bonds, is withdrawn via line (17). The larger part of the mixture is directly supplied to the stirred reactor (7) via line (18), whereas to the smaller part of the mixture metered via line (17) alkyl titanate is added via line (18), so that the composition desired for the catalyst solution is obtained. In the case of the transesterification of DMT, alkyl titanate and in addition dicarboxylic acid or hydroxycarboxylic acid in a weight ratio titanium:acid of 10:1 to 1:10 should advantageously be fed into line (17) as preliminary solution supplied via line (18). The mixture of higher-boiling components and catalyst solution passes through a mixing line (19), in which homogenization is achieved by static mixing elements. Via line (8), the finished catalyst solution reaches the reflux of BDO flowing in line (18) and is then supplied to the stirred reactor (7).

It is also possible to wholly or partly add catalyst solutions to the stirred tank (1) at the metering point (20), and/or feed the same at the metering point (21) into the paste line (4) and/or at the metering point (22) into the transfer line (13) between the stirred reactor (7) and the likewise stirred precondensation reactor (24). The reactor (24) has a heating jacket (25) and an additional heating element (26). The prepolymer from the stirred reactor (24) is supplied to the polycondensation reactor (28) via line (27). The PBT produced in said polycondensation reactor is pumped off via line (29). Via line (30), the vapors formed are sucked off from the stirred reactor (24) and via line (31) from the reactor (28). The temperatures in the reactors (7, 24, 28) lie in the range from 130 to 260° C.

The process in accordance with the invention will subsequently be explained in detail by means of several embodiments.

1.0 Preparation of Preliminary Solutions for the Catalyst Solutions 1.1 97.85 wt-% BDO with a water content of 0.3 wt-% is mixed with 0.05 wt-% TPA and heated to a temperature of 80° C. by stirring, and maintained at this temperature for 30 min and the mixture is then cooled to room temperature. The preliminary solution is clear, no precipitates are formed, and the NTU value is 0.36. When storing the preliminary solution hermetically sealed at a temperature of 25° C., said solution maintains its consistency for a period of 14 days, as is shown by an unchanged NTU value.

For the case that the preliminary solution is produced without heating to a temperature of 80° C., precipitates are formed within 24 hours.

1.2 96.5 wt-% BDO with a water content of 0.15 wt-% is mixed with 1.5 wt-% isophthalic acid and heated to a temperature of 80° C. by stirring, are maintained at this temperature for 30 min and then cooled to room temperature. The preliminary solution is clear; no precipitates are formed. The NTU value is 0.35. When storing the preliminary solution hermetically sealed at a temperature of 25° C., the consistency of the preliminary solution is maintained for a period of 14 days. The NTU value remains unchanged.

2.0 Preparation of Catalyst Solutions 2.1 To the preliminary solution produced in accordance with Example 1, 2.1 wt-% tetrabutyl orthotitanate is added by stirring at a temperature of 40° C., and stirring is continued for one hour at a temperature of 80° C. The catalyst solution formed is clear, has a yellow inherent color and an NTU value of 0.50. The catalyst solution stored hermetically sealed at a temperature of 25° C. for a period of 14 days maintains its consistency, which is demonstrated by an NTU value of 0.44.

2.2 At a temperature of 40° C., 2.1 wt-% tetrabutyl orthotitanate is added by stirring to the preliminary solution produced according to Example 1.2, and stirring is continued for one hour at a temperature of 80° C. The catalyst solution thus produced maintains its consistency at a storage temperature of 25° C. and hermetically sealed for a period of 14 days, as is shown by the NTU value of 0.91.

2.3 At a temperature of 40° C., 7.1 wt-% tetrabutyl orthotitanate is added by stirring to the preliminary solution produced according to Example 1.2, and stirring is continued for one hour at a temperature of 80° C. The catalyst solution produced is clear and maintains its consistency at a storage temperature of 25° C. for a period of 14 days. The NTU value is 0.89.

2.4 97.4 wt-% BDO is mixed with 2.1 wt-% tetrabutyl orthotitanate and heated to 80° C. by stirring. Then, 0.5 wt-% TPA is added, heated to a temperature of 160° C. by stirring and maintained at this temperature for one hour, TPA being dissolved completely. Upon cooling to room temperature, the catalyst solution has an NTU value of 0.66. When stored hermetically sealed for a period of 14 days at a temperature of 25° C., the catalyst solution maintains its consistency. The NTU value remains unchanged.

The same clear catalyst solutions are obtained when instead of TPA the same amount of p-hydroxybenzoic acid or malonic acid is used; samples of this catalyst solution have an NTU value of 0.69 for p-hydroxybenzoic acid and an NTU value of 0.79 for malonic acid.

2.5 To a sample of the reflux of BDO from the bottom of the process column of a continuous plant for esterifying TPA and BDO, which due to the measured acid number contains 3000 ppm TPA equivalents, 2 wt-% tetrabutyl orthotitanate are added at a temperature of 85° C. The catalyst solution formed is clear with an NTU value of 0.51; it maintains its consistency when stored for a period of 14 days at a temperature of 25° C.

2.6 Into the reflux of BDO from the bottom of the process column, which has a temperature of 190° C. and contains 3000 ppm TPA equivalents, tetrabutyl orthotitanate with a temperature of 25° C. is metered in an amount of 0.07 wt-% and mixed with the BDO in a mixing line comprising 6 static mixers. The resulting catalyst solution is fed into the esterification reactor as modified reflux from the process column, and there is adjusted a titanium concentration of 100 ppm based on PBT. This catalyst solution has an NTU value of 0.57, its consistency is maintained over a storage period of 14 days at a temperature of 25° C.

The stability of the catalyst solutions prepared in accordance with Examples 2.1, 2.2, 2.3 and 2.4 under the influence of moisture is tested at room temperature in that samples of catalyst solutions of 100 g each and with a temperature of 25° C. are mixed with 0.5 g, 1.2 g and 5.0 g water, so that the water content of BDO is increased from an initial water content of 0.3 wt-% to 0.8 wt-%, 1.5 wt-% and 6.3 wt-%. When stored hermetically sealed for a period of 14 days at a temperature of 25° C., the catalyst solutions with a water content of 0.8 wt-% remain unchanged. It was furthermore revealed that catalyst solutions which have a water content >1 wt-% become turbid after 2 hours already, and an irreversible precipitate is formed within 4 days.

3.0 Discontinuous Production of PBT Prepolymer 3.1 A stirred reactor having a capacity of 5 l is charged with 22.5 g of a catalyst solution prepared according to Example 2.2, 1127 g TPA (including the amount dissolved in the catalyst solution), and 1813 g BDO (including the BDO contained in the catalyst solution). Upon inertization with nitrogen for three times, the charge is heated to a temperature of 235° C. within 2 hours by stirring at normal pressure and is esterified at this temperature for 2 hours at a pressure of 400 mbar. For a total period of 100 min, a precondensation is then effected at a temperature of 240° C., a pressure of 50 mbar and a stirring rate of 100 $min^{-1}$.

Upon termination of the precondensation, the melt is pressed out from the reactor as a jet by means of nitrogen, collected on a pan cooled with liquid nitrogen, and solidified. For analysis, the product is ground and its intrinsic viscosity and filter load value are determined. The values determined are listed in Table 1 below.

The intrinsic viscosity (IV) is measured at 25° C. in a solution of 500 mg polyester in 100 ml of a mixture of phenol and 1,2 dichlorobenzene (3:2 parts by weight) and constitutes a measure for the molecular weight of the sample.

The filtration behavior of the product melts is obtained by measuring the filter load value characteristic of the purity of the products, in that the PBT prepolymer dried for 13 hours at a temperature of 130° C. and under a reduced pressure of <1 mbar is molten in a laboratory extruder and pressed through a disk filter with a mesh size of 15 $\mu$m and a filter area of 2.83 $cm^2$ by means of a gear pump at a temperature of 260° C. The increase in pressure before the filter is recorded with respect to the amount of melt conveyed, and the filterability is calculated as filter load value (FLV): FLV=increase in pressure $\Delta p$ [bar]·filter area [$cm^2$]/amount of melt [kg].

3.2 For the discontinuous production of PBT prepolymer, a catalyst solution produced according to Example 2.3 is used under otherwise the same process conditions as in Example 3.1. The values for the intrinsic viscosity and for the filter load are indicated in Table 1.

3.3 For the discontinuous production of PBT prepolymer, TPA and BDO are used together with 76.6 g catalyst solution when using p-hydroxybenzoic acid in accordance with Example 2.4, as described in Example 3.1. The product produced has the intrinsic viscosity and filter load values as indicated in Table 1.

3.4 A stirred reactor having a capacity of 5 l is charged with 13.2 g of a catalyst solution prepared according to Example 2.3, 1316 g DMT and 900 g BDO (including the BDO in the catalyst solution). Upon inertization with nitrogen for three times, the charge is heated to a temperature of 150° C. within one hour by stirring at normal pressure, maintained at this temperature for 30 min, and subsequently heated to a temperature of 235° C. within 2 hours and transesterified by removing the methanol. Thereupon, the transesterification product is precondensed for a period of 100 min at a temperature of 240° C., a pressure of 50 mbar and a stirring rate of 100 $min^{-1}$. Upon termination of the prepolycondensation, the melt is pressed out from the reactor as a jet by means of nitrogen and collected on a pan cooled with liquid nitrogen. The intrinsic viscosities and the filter load values of the prepolymers are indicated in Table 1.

3.5 For comparison purposes, tetrabutyl orthotitanate as catalyst solution is directly mixed with BDO at room temperature for the discontinuous production of PBT prepolymer under otherwise the same process conditions as in Example 3.1. The value determined for the intrinsic viscosity of the prepolymer is unchanged, whereas the filter load is increased by a multiple, as is represented in Table 1.

TABLE 1

| | Prepolymer analyses | | | | | |
|---|---|---|---|---|---|---|
| Example | | 3.1 | 3.2 | 3.3 | 3.4 | 3.5 |
| IV | dl/g | 0.168 | 0.170 | 0.174 | 0.174 | 0.165 |
| Filter load value | bar · $cm^2$/kg | 5 | 7 | 6 | 6 | 138 |

4.0 Discontinuous Polycondensation of PBT Prepolymers

Subsequent to the production of PBT prepolymers in the stirred reactor having a capacity of 5 l, a polycondensation is performed at a temperature of 245° C. and a vacuum of 0.5 mbar for a total period of 180 min. The initial rotational speed is 100 $min^{-1}$; upon reaching a certain reference momentum, the rotational speed is reduced to about 30 $min^{-1}$ with this constant momentum, so that comparable values for the intrinsic viscosities are achieved. Subsequent to the polycondensation, the product melt is pressed out from the stirred reactor as a strand, passed through a cooling vat and cut into chips. Table 2 below indicates the measurement results for the intrinsic viscosities and the filter load of these polymers produced from the prepolymers in accordance with Examples 3.1, 3.2, 3.3, 3.4 and 3.5. There are also indicated the results of the determination of terminal COOH groups.

The concentration of terminal COOH groups is determined by means of photometric titration with 0.05% ethanolic potassium hydroxide solution against bromothymol blue of a solution of a polyester in a mixture of o-cresol and chloroform (70:30 parts by weight).

TABLE 2

| Prepolymers from Example | | 3.1 | 3.2 | 3.3 | 3.4 | 3.5 |
|---|---|---|---|---|---|---|
| IV | dl/g | 0.847 | 0.860 | 0.855 | 0.852 | 0.860 |
| Filter load value | bar·cm²/kg | 10 | 9 | 11 | 10 | 98 |
| Terminal COOH groups | meq/kg | 12 | 13 | 13 | 12 | 13 |

5.0 Continuous Production of PBT Prepolymer with Subsequent Discontinuous Polycondensation 5.1 In a paste mixer, TPA and BDO are pasted in a molar ratio of 1:1.5 and via a gear pump stationarily metered into a jacket-heated first stirred reactor in an amount of 2.66 kg/h. In addition, catalyst solution produced in accordance with Example 2.5 with a content of 120 ppm titanium based on the polymer together with 1.193 kg/h mol BDO based on TPA is fed into the bottom of the first reactor. The dwell time of the esterification product in the first reactor is 80 min, the temperature is 245° C. and the pressure is 400 mbar by maintaining a constant filling level in the first reactor. The resulting vapor of water, BDO and THF is continuously withdrawn overhead, condensed in cooled pre-evacuated recipients and removed periodically. Via a connecting line with throttle valve, the esterification product is supplied from the first reactor to a second stirred reactor, in which it is prepolycondensated during a dwell time of 30 min at a temperature of 250° C. and a pressure of 50 mbar by maintaining a constant filling level. The vapor consisting of BDO and lower-boiling components, which was formed in the second reactor, is continuously withdrawn overhead, collected in cooled recipients and discharged periodically. The prepolymer formed in the second reactor is discharged via a gear pump in an amount of 2 kg/h, collected in metal tanks cooled with liquid nitrogen, which are changed every hour, and is frozen. The prepolymer characteristics are 0.256 dl/g for the intrinsic viscosity and 18 bar·cm²/kg for the filter load.

5.2 For comparison purposes, 2.1 wt-% tetrabutyl orthotitanate is used at room temperature instead of catalyst solution in the above-described continuous production of PBT prepolymer. The analyses of the prepolymer revealed an intrinsic viscosity of 0.257 dl/g and a filter load of 293 bar·cm²/kg.

5.3 Upon freezing, grinding and melting, the PBT prepolymer produced continuously in accordance with Example 5.1 is subjected to a discontinuous polycondensation within 1 hour, as described in Example 4.0. On a sample of the polymer produced in this way, an intrinsic viscosity of 0.856 dl/g, a filter load of 15 bar·cm²/kg and an amount of terminal COOH groups of 14 meq/kg is determined.

5.4 The PBT prepolymer produced in accordance with Example 5.2 is subjected to the same experimental conditions as they are represented in Example 4.0. The polymer characteristics are 0.862 dl/g for the intrinsic viscosity, 308 bar·cm²/kg for the filter load and 15 meq/kg for the terminal COOH groups.

The filter load values determined for the prepolymers and the polymers reveal that with the catalyst solutions composed in accordance with the invention a PBT esterification or DMT transesterification is ensured without the occurrence of precipitates.

We claim:

1. A process of producing polybutylene terephthalate (PBT) from butanediol (BDO) and terephthalic acid (TPA), in which a mixture of BDO and TPA is subjected to an esterification in the presence of a catalyst solution containing alkyl titanate at temperatures in the range from 130 to 260° C. and the product of the esterification is subjected to a polycondensation, wherein the catalyst solution contains 0.05 to 10 wt-% alkyl titanate, 85 to 99 wt-% BDO, 50 to 50,000 ppm dicarboxylic acid and/or hydroxycarboxylic acid and/or monohydroxyalkyl dicarboxylic acid and not more than 0.5 wt-% water.

2. A process of producing polybutylene terephthalate (PBT) from butanediol (BDO) and dimethyl terephthalate (DMT), in which a mixture of BDO and DMT is subjected to a transesterification in the presence of a catalyst solution containing alkyl titanate and the product of the transesterification is subjected to a polycondensation, wherein the catalyst solution contains 0.05 to 10 wt-% alkyl titanate, 85 to 99 wt-% BDO, 50 to 50,000 ppm dicarboxylic acid and/or hydroxycarboxylic acid and/or monohydroxyalkyl dicarboxylic acid and not more than 0.5 wt-% water.

3. The process as claimed in claim 1 or 2, wherein the content of dicarboxylic acid and/or hydroxycarboxylic acid and/or monohydroxyalkyl dicarboxylic acid is 50 to 30,000 ppm.

4. The process as claimed in claim 1 or 2, wherein that BDO is mixed with alkyl titanate at temperatures of 50 to 230° C. and dicarboxylic acid and/or hydroxycarboxylic acid and/or monohydroxyalkyl dicarboxylic acid is added to this mixture to form said catalyst solution.

5. The process as claimed in claim 1 or 2, wherein BDO is mixed with dicarboxylic acid and/or hydroxycarboxylic acid and/or monohydroxyalkyl dicarboxylic acid at temperatures of 50 to 230° C. and alkyl titanate is added to this mixture to form said catalyst solution.

6. The process as claimed in claim 1, wherein a vapor mixture containing BDO, water and dicarboxylic acid is withdrawn from the esterification stage, water optionally together with low-boiling components is separated by distillation, and alkyl titanate is admixed to the higher-boiling condensate at a temperature of 50 to 230° C.

7. The process as claimed in claim 1 or 2, wherein said dicarboxylic acid is selected from the group consisting of terephthalic acid, isophtalic acid, oxalic acid, malonic acid, succinic acid, and mixtures thereof.

8. The process as claimed in claim 1 or 2, wherein said hydroxycarboxylic acid is selected from the group consisting of 3-hydroxybenzoic acid, 4-hydroxybenzoic acid, 3-hydroxybutyric acid, hydroxypropanoic acid, glycolic acid and mixtures thereof.

9. The process as claimed in claim 1 or 2, wherein said monohydroxyalkyl dicarbonic acid is monohydroxybutyl terephthalic acid.

10. The process as claimed in claim 1 or 2, wherein said alkyl-titanate is tetrabutyl orthotitanate.

11. The process as claimed in claim 1 or 2, wherein said catalyst solution is additionally introduced in at least one polycondensation stage subsequent to the esterification stage.

* * * * *

UNITED STATES PATENT AND TRADEMARK OFFICE
CERTIFICATE OF CORRECTION

PATENT NO. : 6,967,235 B2
APPLICATION NO. : 10/479339
DATED : November 22, 2005
INVENTOR(S) : Seidel et al.

It is certified that error appears in the above-identified patent and that said Letters Patent is hereby corrected as shown below:

Column 8, Line 30, "wherein that" should read -- wherein --

Column 8, Line 56, "dicarbonic acid" should read -- dicarboxylic acid --

Column 8, Line 59, "alkyl-titanate" should read -- alkyl titanate --

Signed and Sealed this

Twenty-fifth Day of March, 2008

JON W. DUDAS
*Director of the United States Patent and Trademark Office*